(12) United States Patent
Shekhar et al.

(10) Patent No.: US 8,718,063 B2
(45) Date of Patent: May 6, 2014

(54) METHODS AND APPARATUS RELATED TO ROUTE SELECTION WITHIN A NETWORK

(75) Inventors: Ravi Shekhar, Sunnyvale, CA (US);
Jaihari Loganathan, Sunnyvale, CA (US); Jeelani Syed, Bangalore (IN); Rahul Aggarwal, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 13/190,059

(22) Filed: Jul. 25, 2011
(Under 37 CFR 1.47)

(65) Prior Publication Data

US 2012/0189009 A1 Jul. 26, 2012

Related U.S. Application Data

(60) Provisional application No. 61/367,811, filed on Jul. 26, 2010.

(51) Int. Cl.
*H04L 12/56* (2011.01)

(52) U.S. Cl.
USPC ............................ 370/392; 370/252; 370/389

(58) Field of Classification Search
USPC ........................ 370/310, 328, 256, 392; 726/3
See application file for complete search history.

(56) References Cited

U.S. PATENT DOCUMENTS

| | | |
|---|---|---|
| 5,138,615 A | 8/1992 | Lamport et al. |
| 5,801,641 A | 9/1998 | Yang et al. |
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 6,075,773 A | 6/2000 | Clark et al. |
| 6,088,802 A * | 7/2000 | Bialick et al. ................... 726/3 |
| 6,212,183 B1 | 4/2001 | Wilford |
| 6,246,692 B1 | 6/2001 | Dai et al. |
| 6,385,198 B1 | 5/2002 | Ofek et al. |
| 6,393,026 B1 | 5/2002 | Irwin |
| 6,553,028 B1 | 4/2003 | Tang et al. |

(Continued)

FOREIGN PATENT DOCUMENTS

| | | |
|---|---|---|
| EP | 1 318 628 A1 | 6/2003 |
| EP | 1 758 320 A1 | 2/2007 |

(Continued)

OTHER PUBLICATIONS

U.S. Appl. No. 12/345,498, filed Dec. 29, 2008, entitled "Control Plane Architecture for Switch Fabrics".

(Continued)

*Primary Examiner* — Charles C Jiang
*Assistant Examiner* — Mohamed Kamara
(74) *Attorney, Agent, or Firm* — Cooley LLP

(57) ABSTRACT

In some embodiments, an apparatus includes a first network device configured to receive, from a second network device, a first forwarding-state packet associated with a peripheral processing device and having a first generation identifier. The first network device is configured to receive, from a third network device, a second forwarding-state packet associated with the peripheral processing device and having a second generation identifier. The first network device is configured to implement forwarding-state information included in the first forwarding-state packet based on a comparison of the first generation identifier and the second generation identifier.

19 Claims, 6 Drawing Sheets

500

(56) References Cited

U.S. PATENT DOCUMENTS

| | | | |
|---|---|---|---|
| 6,609,153 B1 | 8/2003 | Salkewicz | |
| 6,639,910 B1 | 10/2003 | Provencher et al. | |
| 6,654,373 B1 | 11/2003 | Maher, III et al. | |
| 6,658,481 B1 | 12/2003 | Basso et al. | |
| 6,816,486 B1 | 11/2004 | Rogers | |
| 6,823,454 B1 | 11/2004 | Hind et al. | |
| 6,856,620 B1 | 2/2005 | Dunsmore et al. | |
| 6,865,673 B1 | 3/2005 | Nessett et al. | |
| 6,868,082 B1 | 3/2005 | Allen, Jr. et al. | |
| 6,934,260 B1 | 8/2005 | Kanuri | |
| 7,024,592 B1 | 4/2006 | Voas et al. | |
| 7,173,931 B2 | 2/2007 | Chao et al. | |
| 7,230,947 B1 | 6/2007 | Huber et al. | |
| 7,233,568 B2 | 6/2007 | Goodman et al. | |
| 7,245,629 B1 | 7/2007 | Yip et al. | |
| 7,248,760 B1 | 7/2007 | Corbalis et al. | |
| 7,277,429 B2 | 10/2007 | Norman et al. | |
| 7,289,513 B1 | 10/2007 | Medved et al. | |
| 7,315,897 B1 | 1/2008 | Hardee et al. | |
| 7,330,467 B2 | 2/2008 | Sharma | |
| 7,369,561 B2 | 5/2008 | Wybenga et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,428,219 B2 | 9/2008 | Khosravi | |
| 7,437,469 B2 | 10/2008 | Ellanti et al. | |
| 7,466,703 B1 | 12/2008 | Arunachalam et al. | |
| 7,471,676 B2 | 12/2008 | Wybenga et al. | |
| 7,596,614 B2 | 9/2009 | Saunderson et al. | |
| 7,715,382 B2 | 5/2010 | Lakshman et al. | |
| 7,746,799 B2 | 6/2010 | Kokot et al. | |
| 7,792,993 B1 | 9/2010 | Hopprich et al. | |
| 7,860,097 B1 | 12/2010 | Lovett et al. | |
| 7,877,483 B1* | 1/2011 | Finn | 709/227 |
| 8,089,904 B2 | 1/2012 | Balasubramaniam et al. | |
| 8,175,079 B2 | 5/2012 | Alapuranen et al. | |
| 2002/0009078 A1 | 1/2002 | Wilson et al. | |
| 2002/0051450 A1 | 5/2002 | Ganesh et al. | |
| 2003/0039212 A1 | 2/2003 | Lloyd et al. | |
| 2004/0023558 A1 | 2/2004 | Fowler et al. | |
| 2004/0034702 A1 | 2/2004 | He | |
| 2004/0039820 A1 | 2/2004 | Colby et al. | |
| 2004/0054866 A1 | 3/2004 | Blumenau et al. | |
| 2004/0064559 A1 | 4/2004 | Kupst et al. | |
| 2004/0076151 A1 | 4/2004 | Fant et al. | |
| 2004/0254909 A1 | 12/2004 | Testa | |
| 2005/0063324 A1* | 3/2005 | O'Neill et al. | 370/310 |
| 2005/0129017 A1 | 6/2005 | Guingo et al. | |
| 2005/0138346 A1 | 6/2005 | Cauthron | |
| 2005/0180438 A1 | 8/2005 | Ko et al. | |
| 2005/0193114 A1 | 9/2005 | Colby et al. | |
| 2005/0232258 A1 | 10/2005 | Wybenga et al. | |
| 2005/0267959 A1 | 12/2005 | Monga et al. | |
| 2006/0005185 A1 | 1/2006 | Nguyen | |
| 2006/0092975 A1 | 5/2006 | Ansari et al. | |
| 2006/0164199 A1 | 7/2006 | Gilde et al. | |
| 2006/0165085 A1 | 7/2006 | Konda | |
| 2006/0198321 A1 | 9/2006 | Nadeau et al. | |
| 2007/0036178 A1 | 2/2007 | Hares et al. | |
| 2007/0073882 A1 | 3/2007 | Brown et al. | |
| 2007/0115918 A1 | 5/2007 | Bodin et al. | |
| 2007/0136489 A1 | 6/2007 | Temoshenko et al. | |
| 2007/0153462 A1 | 7/2007 | Crippen et al. | |
| 2007/0283045 A1 | 12/2007 | Nguyen et al. | |
| 2008/0031151 A1 | 2/2008 | Williams | |
| 2008/0086768 A1 | 4/2008 | Mirza-Baig | |
| 2008/0089323 A1 | 4/2008 | Elias et al. | |
| 2008/0112133 A1 | 5/2008 | Torudbakken et al. | |
| 2008/0126788 A1 | 5/2008 | Kreek et al. | |
| 2008/0130517 A1 | 6/2008 | Lee et al. | |
| 2008/0151863 A1 | 6/2008 | Lawrence et al. | |
| 2008/0165704 A1 | 7/2008 | Marchetti et al. | |
| 2008/0186875 A1 | 8/2008 | Kitani | |
| 2008/0192648 A1 | 8/2008 | Galles | |
| 2008/0214059 A1 | 9/2008 | Rothermel et al. | |
| 2008/0219184 A1 | 9/2008 | Fowler et al. | |
| 2008/0320117 A1 | 12/2008 | Johnsen et al. | |
| 2009/0049191 A1 | 2/2009 | Tolliver | |
| 2009/0109963 A1 | 4/2009 | Tanizawa et al. | |
| 2009/0213779 A1 | 8/2009 | Zhang et al. | |
| 2009/0219830 A1 | 9/2009 | Venner et al. | |
| 2009/0271851 A1 | 10/2009 | Hoppe et al. | |
| 2009/0304010 A1 | 12/2009 | Kurebayashi et al. | |
| 2009/0328024 A1 | 12/2009 | Li et al. | |
| 2010/0002382 A1 | 1/2010 | Aybay et al. | |
| 2010/0002714 A1 | 1/2010 | George et al. | |
| 2010/0008361 A1* | 1/2010 | Guichard et al. | 370/392 |
| 2010/0091779 A1 | 4/2010 | Juhl et al. | |
| 2010/0097926 A1 | 4/2010 | Huang et al. | |
| 2010/0165876 A1 | 7/2010 | Shukla et al. | |
| 2010/0165877 A1 | 7/2010 | Shukla et al. | |
| 2010/0169467 A1 | 7/2010 | Shukla et al. | |
| 2010/0182933 A1 | 7/2010 | Hu et al. | |
| 2010/0214949 A1 | 8/2010 | Smith et al. | |
| 2010/0265832 A1 | 10/2010 | Bajpay et al. | |
| 2010/0306408 A1 | 12/2010 | Greenberg et al. | |
| 2011/0019614 A1* | 1/2011 | O'Neill et al. | 370/328 |
| 2011/0069706 A1 | 3/2011 | Sen et al. | |
| 2011/0161468 A1 | 6/2011 | Tuckey et al. | |
| 2012/0033665 A1 | 2/2012 | Jacob Da Silva et al. | |
| 2012/0069842 A1 | 3/2012 | Reddy et al. | |
| 2012/0093154 A1 | 4/2012 | Rosenberg et al. | |
| 2012/0128004 A1 | 5/2012 | Aybay et al. | |
| 2012/0155320 A1 | 6/2012 | Vohra et al. | |
| 2012/0155453 A1 | 6/2012 | Vohra | |
| 2012/0158930 A1 | 6/2012 | Kalusivalingam et al. | |
| 2012/0158942 A1 | 6/2012 | Kalusivalingam et al. | |

FOREIGN PATENT DOCUMENTS

| | | |
|---|---|---|
| EP | 1 892 905 A1 | 2/2008 |
| EP | 1 924 030 A1 | 5/2008 |
| EP | 2 164 209 A1 | 3/2010 |
| EP | 2 413 550 A1 | 7/2011 |
| EP | 2 369 782 A1 | 9/2011 |
| EP | 2 456 138 A1 | 5/2012 |
| EP | 2 466 825 A1 | 6/2012 |
| EP | 2 466 826 A1 | 6/2012 |
| GB | 2 362 289 A | 11/2001 |
| WO | WO 00/08801 | 2/2000 |
| WO | WO 2008/144927 A1 | 12/2008 |

OTHER PUBLICATIONS

Office Action for U.S. Appl. No. 12/345,498, mailed Apr. 28, 2010.
Final Office Action for U.S. Appl. No. 12/345,498, mailed Oct. 26, 2010.
U.S. Appl. No. 12/415,504, filed Mar. 31, 2009, entitled "Methods and Apparatus for Dynamic Automated Configuration Within a Control Plane of a Switch Fabric".
Office Action for U.S. Appl. No. 12/415,504, mailed Apr. 30, 2012.
Final Office Action for U.S. Appl. No. 12/415,504, mailed Oct. 10, 2012.
Office Action for U.S. Appl. No. 13/053,801, mailed Dec. 6, 2012.
Office Action for U.S. Appl. No. 12/969,233, mailed Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.

(56) References Cited

OTHER PUBLICATIONS

Office Action mailed Jul. 30, 2012 for U.S. Appl. No. 12/968,957, filed Dec. 10, 2010.
Office Action mailed Sep. 17, 2012 for U.S. Appl. No. 12/951,706, mailed Sep. 17, 2012.
U.S. Appl. No. 13/435,919, filed Mar. 30, 2012, entitled "Methods and Apparatus for Virtualizing Switch Control Plane Engine".
Office Action mailed Mar. 14, 2013 for U.S. Appl. No. 13/197,212, filed Aug. 3, 2011.
U.S. Appl. No. 13/342,277, filed Dec. 22, 2011, entitled "Methods and Apparatus for Using Border Gateway Protocol (BGP) for Converged Fibre Channel (FC) Control Plane".
U.S. Appl. No. 13/333,031, filed Dec. 21, 2011, entitled "Methods and Apparatus for a Distributed Fibre Channel Control Plane".
U.S. Appl. No. 13/333,039, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".
Office Action mailed Mar. 25, 2013 for U.S. Appl. No. 12/969,277, filed Dec. 15, 2010.
F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Extended Search Report for European Application No. 11158837.2, mailed Jun. 21, 2011.
Extended Search Report for European Application No. 11179603.3, mailed Dec. 21, 2011.
Extended Search Report for European Application No. 11192571.5, mailed Mar. 19, 2012.
Extended Search Report for European Application No. 11192565.7, mailed Mar. 30, 2012.
Extended Search Report for European Application No. 11174003.1, mailed Feb. 8, 2012.
Extended Search Report for European Application No. 11175433.9, mailed Oct. 7, 2011.

\* cited by examiner

| Generation ID 610 | MAC Header 620 | IP Header 630 | Route Information 640 |

FIG. 6

METHODS AND APPARATUS RELATED TO ROUTE SELECTION WITHIN A NETWORK

CROSS-REFERENCE TO RELATED APPLICATION

This application claims priority to and the benefit of U.S. Provisional Patent Application No. 61/367,811, filed Jul. 26, 2010, and entitled "Methods and Apparatus Related to Route Selection within a Network," which is incorporated herein by reference in its entirety.

BACKGROUND

Some embodiments described herein relate generally to networking, and, in particular, to a route selection within a network.

Some known network protocols allow routers to exchange forwarding-state and/or routing infoiination. When updated forwarding-state and/or routing information is received at a router, the router can update and/or store the information in a routing table. Routers exchanging forwarding-state and/or routing information using such known network protocols typically overwrite forwarding-state and/or routing information associated with a particular device if the forwarding-state and/or routing information was received prior to other forwarding-state and/or routing information. Accordingly, such devices use the last and/or most recently received forwarding-state and/or routing information to determine how to route data packets within the network. Depending on processing delays, route suppression and/or other factors, the last and/or most recently received routing information might not be the correct routing information. Accordingly, a need exists for a method to update routing information to ensure that the correct routing information is stored within the routing tables of the routers of a network.

SUMMARY

In some embodiments, an apparatus includes a first network device configured to receive, from a second network device, a first forwarding-state packet associated with a peripheral processing device and having a first generation identifier. The first network device is configured to receive, from a third network device, a second forwarding-state packet associated with the peripheral processing device and having a second generation identifier. The first network device is configured to implement forwarding-state information included in the first forwarding-state packet based on a comparison of the first generation identifier and the second generation identifier.

BRIEF DESCRIPTION OF THE DRAWINGS

FIG. 6 is an illustration of a forwarding-state packet, according to another embodiment.

DETAILED DESCRIPTION

Figure 1:
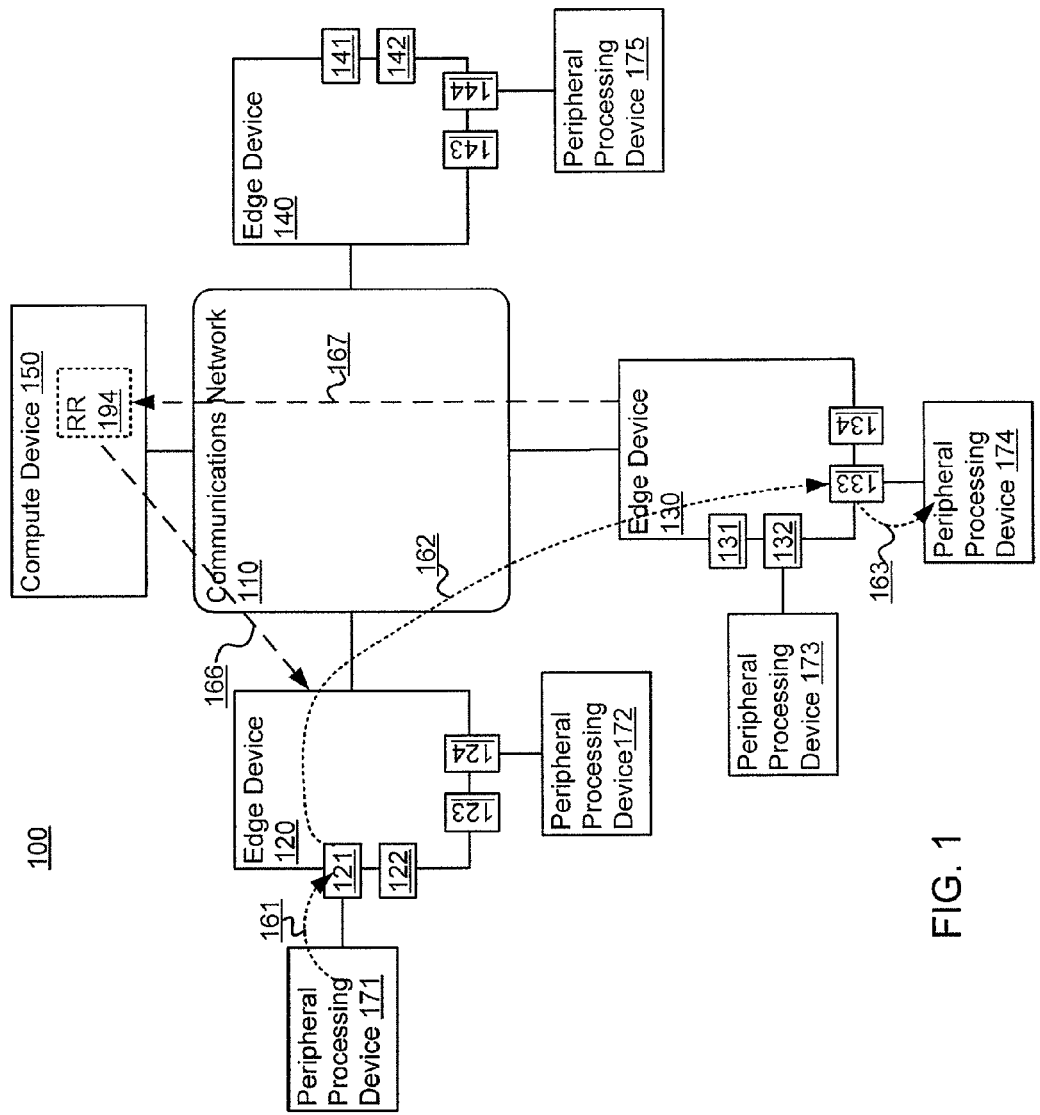
FIG. 1 is a schematic illustration of a communication system, according to an embodiment.

In some embodiments, an apparatus includes a first network device configured to receive, from a second network device, a first forwarding-state packet associated with a peripheral processing device and having a first generation identifier. The first network device is configured to receive, from a third network device, a second forwarding-state packet associated with the peripheral processing device and having a second generation identifier. The first network device is configured to implement forwarding-state information included in the first forwarding-state packet based on a comparison of the first generation identifier and the second generation identifier.

The generation identifier can be associated with an identifier of a peripheral processing device such that each time forwarding-state information is updated, sent and/or advertised for a particular peripheral processing device, its generation identifier is incremented. As such, the first network device can store the forwarding-state information having the largest generation identifier. In other embodiments, the generation identifier can be a time-stamp associated with a time at which a forwarding-state packet is defined. In such embodiments, the first network device can store and/or implement the forwarding-state information with the most recent time-stamp. Based on the generation identifier, the network devices (e.g., edge devices, route reflectors, etc.) within the network can determine the correct forwarding-state information to store in their routing tables.

In some embodiments, a non-transitory processor-readable medium stores code representing instructions to be executed by a process. The code includes code to cause the processor to receive a first forwarding-state packet associated with a peripheral processing device. The first forwarding-state packet includes a first forwarding-state information and a generation identifier having a first value associated with the first forwarding-state information. The code includes code to cause the processor to implement the first forwarding-state information and to receive a second forwarding-state packet associated with the peripheral processing device. The second forwarding-state packet includes a second forwarding-state information and a generation identifier having a second value associated with the second forwarding-state information. The code further includes code to cause the processor to replace the first forwarding-state information with the second forwarding-state information when the second value is preferred over the first value.

In some embodiments, an apparatus includes an edge device configured to detect a peripheral processing device when coupled to the edge device. The edge device is configured to define a first forwarding-state packet associated with the peripheral processing device and including a first forwarding-state information and a generation identifier having a first value associated with the first forwarding-state information. The edge device is configured to receive a second forwarding-state packet associated with the peripheral processing device including a second forwarding-state information and a generation identifier having a second value associated with the second forwarding-state information. The edge device is configured to implement the second forwarding-state information based on a comparison of the first value and the second value.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include, for example, a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connect to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a communication system 100, according to an embodiment. The communication system 100 includes a communications network 110, multiple edge devices 120, 130, 140, a compute device 150 and multiple peripheral processing devices 171-175. The peripheral processing devices 171-175 are operatively coupled to each other by remaining portions of the communication system 100. The peripheral processing devices 171-175 can be, for example, compute nodes, service nodes, routers, and storage nodes, as described in further detail herein. In some embodiments, for example, the peripheral processing devices 171-175 include servers, storage devices, gateways, workstations, routers (e.g., of a different network or communication system) and/or the like.

The peripheral processing devices 171-175 can be operatively coupled to one or more ports 121-124, 131-134, 141-144 of the edge devices 120, 130, 140, respectively, using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to an edge device 120, 130, 140, as described in further detail herein. As such, the peripheral processing devices 171-175 can send data (e.g., data packets, data cells, etc.) to and receive data from the edge devices 120, 130, 140. In some embodiments, the connection between the peripheral processing devices 171-175 and the edge devices 120, 130, 140 is a direct link. Such a link can be said to be a single physical hop link. In other embodiments, the peripheral processing devices can be operatively coupled to the edge devices via intermediate modules. Such a connection can be said to be a multiple physical hop link.

Each edge device 120, 130, 140 can be any device that operatively couples a peripheral processing device 171-175 to the communications network 110. In some embodiments, for example, the edge devices 120, 130, 140 can be access switches, input/output modules, top-of-rack devices, routers and/or the like. Structurally, the edge devices 120, 130, 140 can function as both source edge devices and destination edge devices. Accordingly, the edge devices 120, 130, 140 can send data (e.g., a data stream of data packets and/or data cells) to and receive data from the communications network 110, and to and from the connected peripheral processing devices 171-175.

Each of the edge devices 120, 130, 140 is operable to communicate with the other edge devices 120, 130, 140 via the communications network 110 (e.g., within both a control plane portion and data plane portion). Specifically, the data plane portion of the communications network 110 provides any-to-any connectivity between the edge devices 120, 130, 140 at relatively low latency. As described in further detail herein, in some embodiments, the communications network 110 can have at least hundreds or thousands of ports (e.g., egress ports and/or ingress ports) through which edge devices 120, 130, 140 can transmit and/or receive data.

Figure 2:
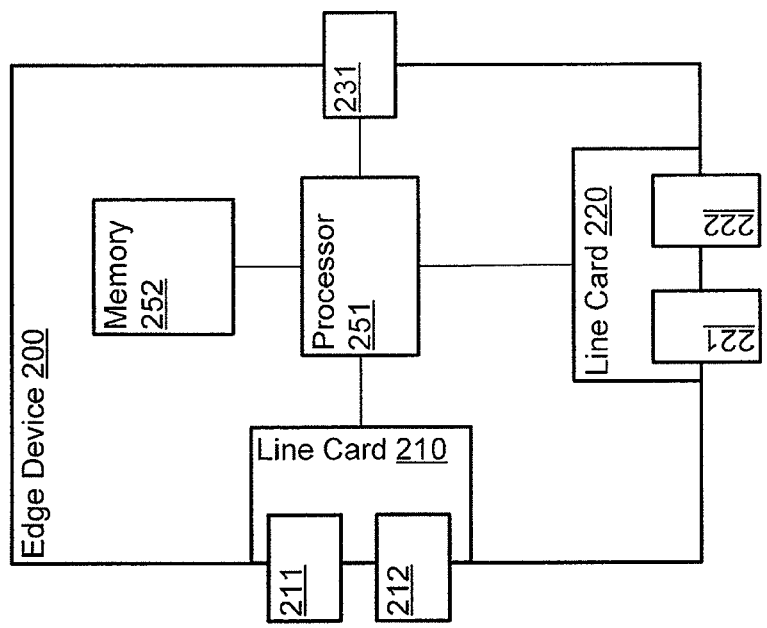
FIG. 2 is a schematic illustration of an edge device of a communication system, according to another embodiment.

FIG. 2 is a system block diagram of an edge device 200 similar to the edge devices 120, 130, 140. The edge device 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown). In other embodiments, the edge device does not include line cards but instead includes ports that directly interface with the edge device (e.g., not through a line card).

Similar to the ports 121-124, 131-134, 141-144 of the edge devices 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow edge device 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, edge device 200 can be in communication with multiple peripheral processing devices using homogeneous or heterogeneous physical layers and/or protocols via ports 211, 212, 221 and 222.

Port 231 can be in communication with other edge devices via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the edge device 200 can send signals to and/or receive signals from a communications network. The signals can be sent to and/or received from the communications network via an electrical link, an optical link and/or a wireless link operatively coupled to the edge device 200. In some embodiments, the edge device 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or data link layer protocol than those implemented at ports 211, 212, 221 and 222. For example, port 211, 212, 221 and 222 can communicate with peripheral processing devices using a protocol based on data packets (e.g., a packet-based protocol such as Ethernet) and port 231 can communicate via a data plane portion of a communications network (e.g., a switch fabric) using a protocol based on data cells (e.g., a cell-based protocol). In such embodiments and as described in further detail herein, the edge device 200 can receive a data packet from a peripheral processing device (e.g., using a packet-based protocol) via a port 211, 212, 221, 222 and divide and/or partition the data packet into data cells. After the data packet is divided and/or partitioned into data cells, the edge device 200 can send the data cells to a data plane portion of a communications network via port 231. Similarly stated, in such embodiments, edge device 200 can convert and/or modify data from a packet-based protocol to a cell-based protocol prior to sending the data to the communications network. Said differently, edge device 200 can be an edge device of a switch fabric such as a distributed switch fabric.

In some embodiments, the edge device 200 can prepare a data packet (e.g., an Ethernet frame and/or packet) to enter a data plane portion of a communications network (e.g., communications network 110). For example, the edge device 200 can forward, classify, and/or modify the packet encapsulation (e.g., modify, add and/or remove a header portion, footer portion and/or any other identifier included within the data packet) of a data packet prior to sending the data packet to the data plane portion of the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

The compute device 150 can host management modules, processes and/or functions associated with the communication system 100. As shown in FIG. 1, the compute device 150 can host a route reflector 194. The route reflector 194 can function as a route reflector between the control plane portions of the edge devices 120, 130, 140. In the control plane, the edge devices 120, 130, 140 are operatively coupled to each other through the route reflector 194. As shown in FIG. 1, and as described in further detail herein, such a connection can be through a control plane portion of the communications network 110.

The edge devices 120, 130, 140 can send forwarding-state information (e.g., using a control signal) to each other via the route reflector 194. For example, as described in further detail herein, edge device 130 can send forwarding-state information (e.g., route information) associated with the peripheral processing devices 173, 174 to the edge device 120 via the route reflector 194 (e.g., shown as path 167 and path 166). In some embodiments, the forwarding-state information can be sent from the edge device 130 to the edge device 120 using the Boarder Gateway Protocol (BGP). In such embodiments, the route reflector 194 can be said to be a BGP Route Reflector. Using a targeted protocol, such as BGP, an edge device 120, 130, 140 can send the forwarding-state information to specific edge devices 120, 130, 140 while refraining from sending the forwarding-state information to other edge devices 120, 130, 140, as described in further detail herein.

In some embodiments, the route reflector 194 can store an address and/or identifier associated with the edge devices 120, 130, 140. In such embodiments, when an edge device 120, 130, 140 has updated forwarding-state information to distribute and/or advertise, the edge device 120, 130, 140 can send the updated forwarding-state information to the route reflector 194. The route reflector 194 can then send the forwarding-state information to the other edge devices 120, 130, 140.

In other embodiments, the edge devices 120, 130, 140 are directly coupled to each other within the control plane without a route reflector 194 acting as a route reflector. In such embodiments, the edge devices 120, 130, 140 can store an address and/or identifier associated with the other edge devices 120, 130, 140 and send updated forwarding-state information directly to the other edge devices 120, 130, 140 via the control plane.

In some embodiments, each edge device 120, 130, 140 can be part of a network segment (e.g., a virtual local area network (VLAN), a virtual switch fabric, etc.). For example, edge device 120 and edge device 130 can be part of a first network segment, and edge device 140 can be part of a second network segment. In such embodiments, each edge device 120, 130, 140 sends forwarding-state information to the other network control entities within the same network segment but not to the edge devices 120, 130, 140 within another network segment. Accordingly, the route reflector 194 sends updated forwarding-state information received from an edge device 120, 130, 140 to the other edge devices 120, 130, 140 associated with its network segment but not to the edge devices 120, 130, 140 within another network segment. As such, in the above example the edge device 130 sends forwarding-state information to the edge device 120 but not the edge device 140. In such embodiments, the higher level network control entities (e.g., route reflector 194) within the control plane of the communication system 100 can be said to implement and/or enforce rules and/or policies associated with the network segments.

Figure 3:
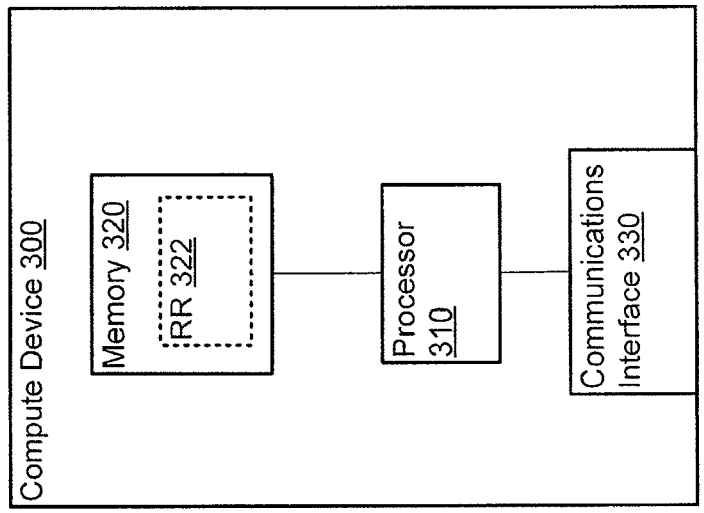
FIG. 3 is a schematic illustration of a compute device of a communication system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or edge devices via communications interface 330.

As illustrated in FIG. 3, compute device 300 can host a route reflector 322 similar to the route reflector 194 shown in FIG. 1. In other words, route reflector 322 can be a process, application, virtual machine, and/or some other software module (executing in hardware) or hardware module that is executed at compute device 300. In some embodiments, for example, instructions that implement route reflector 322 can be stored at memory 320 and executed at processor 310.

In some embodiments, compute device 300 can be dedicated to hosting route reflector 322. In other words, compute device 300 can allocate all or substantially all of its computing resources (e.g., processing capacity and memory) to route reflector 322. In some embodiments, compute device 300 can host other processes, applications, virtual machines, and/or software modules in addition to route reflector 322. For example compute device 300 can be a general purpose compute device or compute node that hosts multiple processes, applications, virtual machines, and/or software modules.

Returning to FIG. 1, the communications network 110 can be any suitable communications network that operatively couples the edge devices 120, 130, 140 to the other edge devices 120, 130, 140. Additionally, the communications network can operatively couple the compute device 150 to the edge devices 120, 130, 140. In some embodiments, the communications network 110 includes a data plane portion and a control plane portion. The control plane portion of the communications network 110 facilitates transmission of control signals (e.g., configuration information, forwarding-state information, etc.) between the edge devices 120, 130, 140 and the network management module 155. Accordingly, the edge devices 120, 130, 140 can send configuration information and/or forwarding-state information to other edge devices 120, 130, 140 via the control plane portion of the communications network 110. In some embodiments, the control plane portion of the communications network 110 includes direct links between the route reflector 194 and the edge devices 120, 130, 140. In other embodiments, the control plane portion of the communications network 110 can include intermediate modules and/or switches to operatively couple the edge devices 120, 130, 140 with the route reflector 194.

The data plane portion of the communications network 110 facilitates transmission of data between edge devices 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated cell-based switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first edge device 120, 130, 140 and a second edge device 120, 130, 140 (e.g., along with the data paths between the edge devices 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the physical implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, each edge device 120, 130, 140 can send initial and/or updated forwarding-state information to the other edge devices 120, 130, 140 when the forwarding-state associated with its group of ports 181-183 is initiated, changed and/or modified. For example, in response to the peripheral processing device 174 being initially coupled to the port 133, the network control entity 192 can send forwarding-state information associated with the port 133 and the destination peripheral processing device 174 to the network control entity 193. In other embodiments, the network control entity 192 can also send the forwarding-state information to the network control entity 191. Such forwarding-state information can be sent using a targeted protocol (e.g., BGP).

As shown in FIG. 1, the edge device 130 sends the forwarding-state information to the route reflector 194 via the path 167. Specifically, the edge device 130 retrieves an identifier and/or address associated with the route reflector 194 (e.g., stored in a memory of the edge device 130) and sends the forwarding-state information accordingly. The path 167 can be said to be a single logical hop between the network control entity 192 and the route reflector 194. In some embodiments, the path 167 can also be said to be a single physical hop between the edge device 130 and the compute device 150.

The route reflector 194 can then send the forwarding-state-information to the edge device 120. Specifically, the route reflector 194 determines that the forwarding-state information should be sent to the edge device 120 (e.g., the edge device 120 is part of a same network segment as the edge device 130), retrieves an identifier and/or address associated with the edge device 120 (e.g., stored in a memory of the compute device 150), and sends the updated forwarding-state information accordingly. As described in further detail herein, this allows peripheral processing device 171 to send data to peripheral processing device 174, which is coupled to edge device 130. Similar to the path 167, the path 166 can be said to be a single logical hop between the route reflector 194 and the network control entity 193. In some embodiments, the path 166 can also be said to be a single physical hop between the compute device 150 and the edge device 120. The edge device 130 can store the forwarding-state information within a memory (e.g., within a switching table and/or a routing table).

A data packet (e.g., an Ethernet frame and/or packet) can be sent between peripheral processing devices 171-175 using remaining portions of the communication system 100. For example, a data packet can be sent from a source peripheral processing device 171 to a destination peripheral processing device 174. The source peripheral processing device 171 can send the data packet to the edge device 120 through port 121 using a first data link layer protocol (e.g., a packet-based protocol such as, for example, Ethernet, Fibre Channel, etc.). This is shown by path 161 in FIG. 1.

Based on the forwarding-state information, the edge device 120 can prepare the data packet to enter the communications network 110. In some embodiments, for example, the edge device 120 can add and/or append a header (e.g., encapsulate) to the data packet having a destination address of the peripheral processing device 174, the port 133 and/or the edge device 130. In some embodiments, the edge device 120 can also divide and/or partition the data packet into multiple data cells to be sent through the data plane portion of the communications network 110 to the edge device 130. In such embodiments, for example, the edge device 120 can divide and/or partition the data packet into multiple fixed-length data cells each containing a destination header (e.g., being encapsulated by a destination header) having a destination address of the peripheral processing device 174, a destination address of the port 133 and/or a destination address of the edge device 130.

The data packet and/or cells are sent to the edge device 130 through the data plane portion of the communications network 110 as illustrated by path 162. The data plane portion of the communications network 110 can route and/or forward the data packet and/or cells based on the destination address of the peripheral processing device 174, the port 133 and/or the edge device 130.

The edge device 130 can then prepare the data packet and/or cells to be sent to the peripheral processing device 174 via the port 133 as shown by path 163. Such preparation can include removing a header (e.g., decapsulating the data cells) having the destination address of the peripheral processing device 174, the port 133 and/or the edge device 130 from the data cells (i.e., the header appended to the data cells by the edge device 120 and used by the data plane portion of the communications network 110 to route and/or forward the data). In some embodiments, such preparation can also include reconstructing and/or reassembling the data packet and/or frame from the data cells. After the data packet and/or frame is ready, the edge device 130 sends the data packet to the peripheral processing device 174 through port 133.

Figure 4:
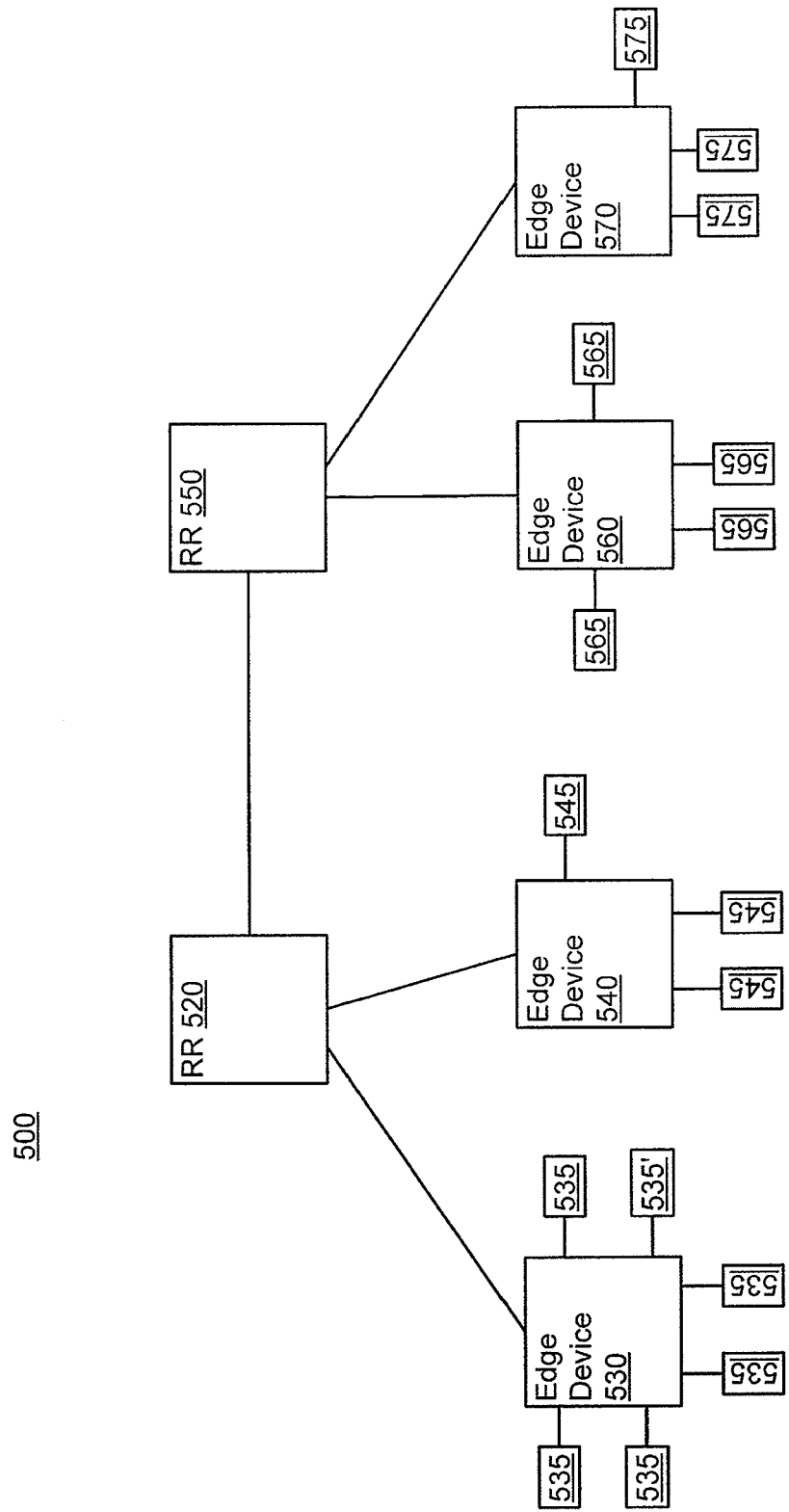
FIG. 4 is a logical illustration of a control plane of a communication system in a first configuration, according to another embodiment.

FIG. 4 is a logical illustration of a control plane 500 of a communication system in a first configuration, according to an embodiment. The control plane 500 includes four edge devices 530, 540, 560 and 570. Each edge device 530, 540, 560, 570 is operatively coupled to multiple peripheral processing devices 535, 545, 565, 575, respectively. As such, the edge device 530 manages and/or maintains route and/or forwarding-state information for the peripheral processing devices 535, the edge device 540 manages and/or maintains route and/or forwarding-state information for the peripheral processing devices 545, the edge device 560 manages and/or maintains route and/or forwarding-state information for the peripheral processing devices 565 and the edge device 570 manages and/or maintains route and/or forwarding-state information for the peripheral processing devices 575.

The control plane 500 also includes route reflectors 520 and 550. The route reflectors 520 and 550 function as intermediary entities and/or modules between the edge devices 530, 540, 560, 570. Similarly stated, each edge device 530, 540, 560, 570 is operatively coupled to the other edge devices 530, 540, 560, 570 within the control plane 500 via at least one route reflector 520, 550. As such, each edge device 530, 540, 560, 570 can send forwarding-state and/or routing information to the other edge devices 530, 540, 560, 570 via at least one route reflector 520, 530. In some embodiments, the route reflectors 520, 550 function as BGP Route Reflectors.

In use, each edge device 530, 540, 560, 570 can send forwarding-state and/or routing information to the other edge devices 530, 540, 560, 570 when a peripheral processing device 535, 545, 565, 575 is initially coupled and/or when a change in configuration of an already coupled peripheral processing device 535, 545, 565, 575 is detected. For example, when peripheral processing device 535' is initially coupled to the edge device 530, the edge device 530 can send forwarding-state information (e.g., port identifiers, network segment identifiers, peripheral processing device identifiers (a media access control (MAC) address, an interne protocol (IP) address), etc.) to the other edge devices 540, 560, 570. In some embodiments, for example, the edge device 530 can send the forwarding-state information via the route reflectors 520, 550 using BGP. More specifically, the edge device 530 can initially send the forwarding-state information to the route reflector 520. The route reflector 520 can store the forwarding-state information in its own routing table and forward and/or send the forwarding-state information to the edge device 540 and the route reflector 550. The route reflector 550 can store the forwarding-state information in its own routing table and then forward and/or send the forwarding-state information to the edge device 560 and the edge device 570. In such a manner, the edge device 530 can advertise the forwarding-state information associated with the peripheral processing device 535' to the other edge devices 540, 560, 570 and the route reflectors 520, 550.

When the an edge device (e.g., edge device 560) receives the forwarding-state information associated with the peripheral processing device 535', it can store the forwarding-state information in a routing table. For example, the edge device 560 can store and/or associate in a routing table an identifier of the edge device 530 with a media access control (MAC) address and/or an internet protocol (IP) address of the peripheral processing device 535'. This allows the edge device 560 to send data to the peripheral processing device 535' via a data plane of the communication system. More specifically, when the edge device 560 receives data from a peripheral processing device 565 addressed to the peripheral processing device 535', the edge device 560 can query its routing table to determine that the peripheral processing device 535' is coupled to the edge device 530, and address the data accordingly.

In some embodiments, the edge device 530 can periodically send forwarding-state signals to the route reflectors 520, 550 and the edge devices 540, 560, 570. In such embodiments, an update forwarding-state signal is sent after an elapsed amount of time. This can help to ensure that the routing tables at the route reflectors 520, 550 and the edge devices 540, 560, 570 are current.

Figure 5:
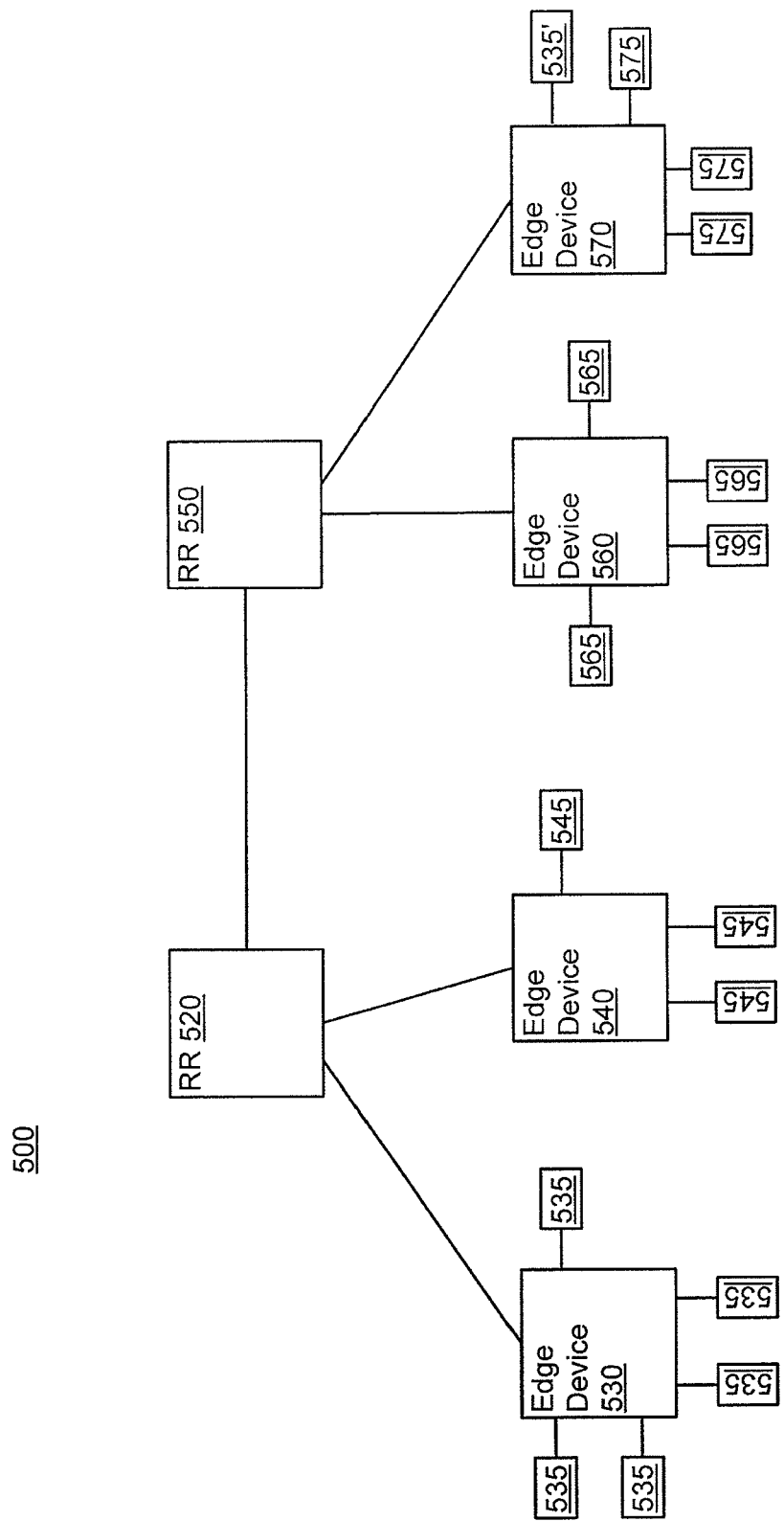
FIG. 5 is a logical illustration of the control plane of the communication system of FIG. 4 in a second configuration.

FIG. 5 is a logical illustration of the control plane 500 of the communication system in a second configuration. Specifically, in the second configuration, the peripheral processing device 535' is operatively coupled to the edge device 570. When the control plane 500 is initially moved from its first configuration (FIG. 4) to its second configuration (FIG. 5), the edge device 570 detects that the peripheral processing device 535' has been coupled to the edge device 570 and sends updated forwarding-state information to the route-reflectors 520, 550 and the other edge devices 530, 540, 560, accordingly. Based on the newly-received information, the route reflectors 520, 550 and the edge devices 530, 540, 560 can update their routing information based on the newly-received routing information.

In some known large networks, the last received forwarding-state information at an edge device is not always the correct and/or most up-to-date forwarding-state information. For example, in such known large networks, because of processing and/or signal transmission delays, a correct forwarding-state signal can be received at an edge device prior to a previously sent out-dated forwarding-state signal. In such known large networks, the incorrect and later received forwarding-state information associated with the first configuration overwrites the correct, but previously received, forwarding-state information.

In some embodiments described herein, some protocols, such as BGP, can use advertisement suppression at route reflectors 520, 550 when transmitting and/or advertising forwarding-state information. For example, in the first configuration (FIG. 4), the peripheral processing device 535' can be operatively coupled to the edge device 530 and the edge device 530 can send forwarding-state information to the route reflector 520, which sends forwarding-state information to the route reflector 550 and the edge device 540. The route reflector 550 sends the forwarding-state information to the edge devices 560 and 570. Similarly, when the control plane 500 is moved to the second configuration, the edge device 570 can send forwarding-state information to the route reflector 550, which sends forwarding-state information to the route reflector 520 and the edge device 560. The route reflector 520 sends the forwarding-state information to the edge devices 530 and 540. The edge device 530 can rewrite its routing table and withdraw its advertisement associated with the peripheral processing device 535' to the route reflector 520. If the control plane 500 moves back to the first configuration prior to the route reflector 520 withdrawing its initial advertisement to route reflector 550 (i.e., rewriting its routing table), the subsequent forwarding-state advertisement from the edge device 530 to the route reflector 520 is not forwarded to the route reflector 550 because the route reflector 520 determines that the forwarding-state advertisement has already been sent. Accordingly, in the routing tables of route reflector 550 and the edge devices 560 and 570, the peripheral processing device 535' is listed as being coupled to the edge device 570, although it is actually coupled to the edge device 530. Similarly stated, because the route reflector 520 suppresses sending the updated forwarding-state information, the routing tables of route reflector 550 and the edge devices 560 and 570 are not updated.

To alleviate such problems, in some embodiments an edge device 530, 540, 560, 570 can append a generation identifier to a forwarding-state packet prior to advertising the forwarding-state to the other edge devices 530, 540, 560, 570. FIG. 6, for example, illustrates a forwarding-state packet 600 having a generation identifier 610. Such a generation identifier 610 can be associated with, for example, the number of times the forwarding-state associated with a particular peripheral processing device 535, 545, 565, 575 (e.g., a particular MAC address) has been changed and/or modified. In some embodiments, for example, the generation identifier 610 associated with a peripheral processing device operatively coupled to the communication system for a first time can be one. Similarly, the first time the peripheral processing device is moved and/or reconfigured, the generation identifier 610 can be incremented to two. Each time the forwarding-state information changes for a particular peripheral processing device, the generation identifier 610 for that particular peripheral processing device can similarly be incremented.

The generation identifier 610 can notify the other edge devices 530, 540, 560, 570 of the version and/or order of the change in forwarding-state information. For example, if an edge device 530, 540, 560, 570 receives a forwarding-state packet associated with a particular peripheral processing device 535, 545, 565, 575 having a generation identifier greater than the generation identifier currently associated with that peripheral processing device 535, 545, 565, 575 in that edge device's routing table, the edge device 530, 540, 560, 570 can update the routing table to include the newly-received forwarding-state information. Similarly, if an edge device 530, 540, 560, 570 receives a forwarding-state packet associated with a particular peripheral processing device 535, 545, 565, 575 having a generation identifier less than the generation identifier currently associated with that peripheral processing device 535, 545, 565, 575 in that edge device's routing table, the edge device 530, 540, 560, 570 can discard the newly-received forwarding-state information as being out-dated.

In some embodiments, an edge device 530, 540, 560, 570 can receive two different forwarding-state packets for the same peripheral processing device 535, 545, 565, 575 having the same generation identifier. For example, when the peripheral processing device 535' is initially coupled to the edge device 530, the edge device 530 can send a forwarding-state packet with a generation identifier of one. If the edge device 570 does not receive the forwarding-state information sent from the edge device 530 when the control plane 500 is in the first configuration prior to the control plane 500 moving to its second configuration, the edge device 570 will also send a forwarding-state packet with a generation identifier of one. In the above example, the edge device 560 receives the forwarding-state information from the edge device 570 prior to receiving the forwarding-state information from the edge device 530. Because the current forwarding-state information from the edge device 570 has the same generation identifier as the forwarding-state information from the edge device 530, the edge device 560 will not be able to determine which forwarding-state information is correct solely based on the generation identifiers.

In such embodiments, the edge device 560 can use a tiebreaker to determine which forwarding-state information to store. For example, the edge device 560 can use an identifier associated with the source edge devices to determine which forwarding-state information to store. In some embodiments, for example, the edge device 560 can compare an IP address of the edge device 530 with an IP address of the edge device 570. In such embodiments, the forwarding-state information sent from the edge device 530, 570 having the higher IP address is stored in the routing table of the edge device 560. As such, if the IP address of the edge device 530 is greater than the IP address of the edge device 570, the forwarding-state information received from the edge device 530 can be stored. Similarly, if the IP address of the edge device 570 is greater than the IP address of the edge device 530, the forwarding-state information received from the edge device 570 can be stored. Such a tiebreaker can be used at each edge device 530, 540, 560, 570. Accordingly, every edge device 530, 540, 560, 570 can store the same forwarding-state information associated with the peripheral processing device 535'. In other embodiments, any other type of comparison that results in every edge device 530, 540, 560, 570 and every route reflector 520, 550 storing the same forwarding state information for a particular peripheral processing device can be used (e.g., lower IP address, greater MAC address, lower MAC address, etc.).

If the edge device 570 has a larger IP address than the edge device 530, the edge device 560 (along with every other edge device receiving the forwarding-state information) will store the forwarding-state information received from the edge device 570. Accordingly, the forwarding-state for the peripheral processing device 535' is correctly associated with the edge device 570. If, however, the edge device 530 has a larger IP address than the edge device 570, the edge device 560 (along with every other edge device receiving the forwarding-state information) will store the forwarding-state information received from the edge device 530. This results in the edge devices 530, 540, 560, 570 and route reflectors 520, 550 within the communication system storing incorrect forwarding-state information for the peripheral processing device 535'.

Edge device 570 will also store incorrect forwarding-state information for the peripheral processing device 535' to which it is physically coupled. Accordingly, the edge device 570 will once again detect that peripheral processing device 535' has been operatively coupled to the edge device 570 and generate another forwarding-state packet. Because the initial forwarding-state signal (from edge device 530) was stored in the routing table at the edge device 570, the second forwarding-state signal generated by the edge device 570 will have a generation identifier of two. Accordingly, when the second forwarding-state signal is advertised to the other edge devices 530, 540, 560 and the route reflectors 520, 550, the incorrect forwarding-state (having a generation identifier of one) is overwritten with the correct and up-to-date forwarding-state information (having a generation identifier of two). Accordingly, in such a manner, incorrect forwarding-state information stored within the routing tables can be quickly updated.

As shown in FIG. 5, the generation identifier 610 can be appended to a forwarding-state packet 600 in front of a MAC header 620. Such a MAC header 620 can include a MAC address of the source edge device 530, 540, 560, 570, a MAC address of one or more destination edge devices 530, 540, 560, 570 and/or the like. The IP header 630 can include an IP address of the source edge device 530, 540, 560, 570, an IP address of one or more destination edge devices 530, 540, 560, 570 or route reflectors 520, 550 and/or the like. As discussed above, a destination edge device 530, 540, 560, 570 and/or route reflector 520, 550 can use the IP address of the source edge device 530, 540, 560, 570 as a tiebreaker between forwarding-state information packets having a same generation identifier 610. Additionally, the forwarding-state packet 600 can include route information 640 to be stored in the routing tables of the edge devices 530, 540, 560, 570 and/or route reflectors 520, 550. Such information can include routing information (e.g., MAC address, IP address) associated with the source edge device 570.

In other embodiments, the generation identifier 610 can be stored in any suitable place. In some embodiments, for example, the generation identifier 610 can be stored as an attribute of a BGP update message and/or a local preference (e.g., local-pref) of a BGP message.

Using a generation identifier allows the communication system to effectively and accurately update the forwarding-state information across the edge devices 530, 540, 560, 570 and the route reflectors 520, 550. Additionally, because each peripheral processing device is assigned a different generation identifier based on the number of times updated, such a generation identifier does not require global synchronization across all edge devices but is relevant only across edge devices that advertise an identifier associated with a particular peripheral processing device. Further, using a generation identifier allows an edge device to advertise a route that is preferred over another advertised route as soon as it detects that the route is locally attached. This also eliminates suppression of multiple advertisements in the case of a peripheral processing device moving between edge devices because the generation identifier is increased each time the route is advertised.

In other embodiments, instead of using a version-based generation identifier associated with the number of times the forwarding-state associated with a particular peripheral processing device has been changed and/or modified to determine which forwarding-state information is current, the generation identifier can be an origination time of a forwarding-state packet. In such embodiments, for example, each time an edge device sends a forwarding-state packet, the edge device can append a header (and/or amend another portion of the forwarding-state packet) to include an origination time. In such embodiments, a receiving edge device can determine which forwarding-state packet is more current. Such a determination is irrespective of transmission delays and/or times because the timestamp is associated with when the source edge device originated the forwarding-state packet and not when the destination edge device received the forwarding-state packet. In this manner, more current forwarding-state information can overwrite older forwarding-state information while less current forwarding-state information can be discarded.

In embodiments where a source edge device sends an origination time with the forwarding-state packet, the time at each edge device can be synchronized. For example, a time synchronization protocol (e.g., Network Time Protocol (NTP)) can be implemented on each of the edge devices and route reflectors (e.g., every BGP speaker in the system). Additionally, such a protocol can be run and/or executed at a sufficient granularity.

Returning to FIG. 4, as discussed above, in some embodiments, the edge device 530 does not advertise and/or send the routing information associated with the peripheral processing device 535' to every other edge device 540, 560, 570. For example, if the edge devices 530 and 560 are part of a first network segment (e.g., VLAN) and edge devices 540 and 570 are part of a second network segment, the edge device 530 can send the forwarding-state information associated with the peripheral processing device 535' to the edge device 560 without sending the forwarding-state information associated with the peripheral processing device 535' to the edge devices 540 and 570. In such embodiments, the route reflectors 520, 550 can implement the rules and/or policies associated with the different network segments.

Figure 7:
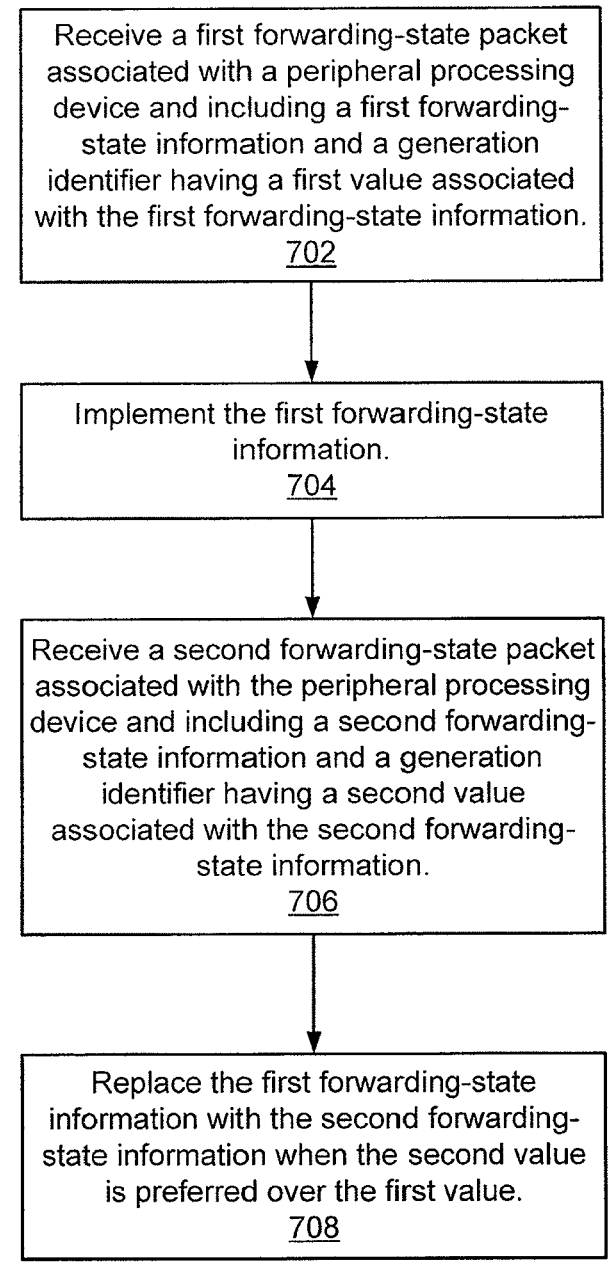
FIG. 7 is a flow chart illustrating a method of selecting a route, according to another embodiment.

FIG. 7 is a flow chart illustrating a method 700 of selecting a route, according to another embodiment. The method 700 includes receiving a first forwarding-state packet associated with a peripheral processing device and including a first forwarding-state information and a generation identifier having a first value associated with the first forwarding-state information, at 702. In some embodiments, the first forwarding-state information can include route information for the peripheral processing device. In some embodiments, the generation identifier can be a number associated with a number of times forwarding state information has been advertised for that peripheral processing device. In other embodiments, the generation identifier can be a time stamp that indicates a time at which the first forwarding-state packet was defined.

The first forwarding-state information is implemented, at 704. In some embodiments, this can include updating a forwarding-state database, a routing table and/or a lookup table to include the forwarding-state information. Accordingly, the first forwarding-state information can be used when addressing a data packet to the peripheral processing device.

A second forwarding-state packet associated with the peripheral processing device and including a second forwarding-state information and a generation identifier having a second value associated with the second forwarding state information is received, at 706. The second forwarding-state packet (including the second-forwarding state information and the generation identifier having the second value) can be formatted similar to the first forwarding-state packet.

The first forwarding-state information is replaced with the second forwarding-state information when the second value is preferred over the first value, at 708. In some embodiments, the second value is preferred over the first value when the second value is greater than the first value. In other embodiments, the second value is preferred over the first value when the second value is more recent than the first value. In still other embodiments, the second value can be preferred over the first value based on any other suitable comparison.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a communication system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a communication system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a communication system.

In some embodiments, one or more of the routers can be networking devices operable to connect at least a portion of a communication system (e.g., a data center) to another network (e.g., the global Internet). In some embodiments, for example, a router can enable communication between components (e.g., peripheral processing devices, portions of the switch fabric) associated with a communication system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive, at a first network device from a second network device, a first forwarding-state packet associated with a peripheral processing device and having a first generation identifier;
   receive, at the first network device from a third network device, a second forwarding-state packet associated with the peripheral processing device and having a second generation identifier;
   implement forwarding-state information included in the first forwarding-state packet when (1) a value of a device identifier of the second network device meets at least one criterion with respect to a value of a device identifier of the third network device and (2) the value of the first generation identifier is equal to the value of the second generation identifier; and
   implement forwarding-state information included in the second forwarding-state packet when (1) the value of the device identifier of the second network device does not meet at least one criterion with respect to the value of the device identifier of the third network device and (2) the value of the first generation identifier is equal to the value of the second generation identifier.

2. The non-transitory processor-readable medium of claim 1, wherein the device identifier of the second network device is an Internet Protocol (IP) address.

3. The non-transitory processor-readable medium of claim 1, wherein the first generation identifier is a first time stamp and the second generation identifier is a second time stamp, the first time stamp indicating a time at which the first forwarding-state packet was defined by the second network device, the second time stamp indicating a time at which the second forwarding-state packet was defined by the third network device, the time for the first time stamp being more recent than the time for the second time stamp.

4. The non-transitory processor-readable medium of claim 1, wherein the first network device includes a portion of a distributed control plane of a switch fabric that includes the first network device, the second network device and the third network device.

5. The non-transitory processor-readable medium of claim 1, further comprising code to cause the processor to receive the first forwarding-state packet prior to receiving the second forwarding-state packet.

6. The non-transitory processor-readable medium of claim 1, further comprising code to cause the processor to receive the second forwarding-state packet prior to receiving the first forwarding-state packet.

7. The non-transitory processor-readable medium of claim 1, wherein the first network device is one of an edge device or a route reflector.

8. A non-transitory processor-readable medium storing code representing instructions to be executed by a processor, the code comprising code to cause the processor to:
   define, at an edge device, a first forwarding-state packet associated with a peripheral processing device, the first forwarding-state packet including a first forwarding-state information and a generation identifier having a first value associated with the first forwarding-state information;
   implement the first forwarding-state information;
   receive, at the edge device, a second forwarding-state packet associated with the peripheral processing device, the second forwarding-state packet including a second forwarding-state information and a generation identifier having a second value associated with the second forwarding-state information;
   replace the first forwarding-state information with the second forwarding-state information when the second value is preferred over the first value;
   detect, after defining the first forwarding-state packet and receiving the second forwarding-state packet, that the peripheral processing device is coupled to the edge device; and
   define, in response to detecting, a third forwarding-state packet associated with the peripheral processing device the third forwarding-state racket including the first forwarding-state information and a generation identifier having a third value greater than both the first value and the second value.

9. The non-transitory processor-readable medium of claim 8, further comprising code to cause the processor to:
   discard the second forwarding-state information based on the second value indicating that the second forwarding-state packet was generated prior to the first forwarding-state packet.

10. The non-transitory processor-readable medium of claim 8, wherein the first value is a first time stamp indicating a time at which the first forwarding-state packet was defined, the second value is a second time stamp indicating a time at which the second forwarding-state packet was defined.

11. The non-transitory processor-readable medium of claim 8, further comprising code to cause the processor to:
   compare, in response to the first value being equal to the second value, an Internet Protocol (IP) address associated with a source of the first forwarding-state packet with an IP address associated with a source of the second forwarding-state packet to determine whether to replace the first forwarding-state information with the second forwarding-state information.

12. An apparatus, comprising:
an edge device including a processor that is configured to detect a peripheral processing device when coupled to the edge device, the processor configured to define a first forwarding-state packet associated with the peripheral processing device and including a first forwarding-state information and a generation identifier having a first value associated with the first forwarding-state information,
the processor configured to receive a second forwarding-state packet associated with the peripheral processing device including a second forwarding-state information and a generation identifier having a second value associated with the second forwarding-state information,
the processor configured to implement the second forwarding-state information if the second value is greater than the first value,
the processor configured to compare, if the first value is equal to the second value, a first device identifier associated with the edge device and a second device identifier associated with a source of the second forwarding-state packet to determine whether to replace the first forwarding-state information with the second forwarding-state information.

13. The apparatus of claim 12, wherein the first value is associated with a time at which the edge device defined the first forwarding-state packet, the second value is associated with a time at which the second forwarding-state packet was defined.

14. The apparatus of claim 12, wherein the processor is configured to receive the second forwarding-state packet after defining the first forwarding-state packet.

15. The apparatus of claim 12, wherein the processor is configured to receive the second forwarding-state packet prior to defining the first forwarding-state packet.

16. The apparatus of claim 12, wherein the processor is configured to send the first forwarding-state packet to at least one network device other than the peripheral processing device.

17. The apparatus of claim 12, wherein the processor is configured to define the first forwarding-state packet in response to detecting the peripheral processing device coupled to the edge device at a first time, the processor configured to define a third forwarding-state packet associated with the peripheral processing device and including a generation identifier having a third value in response to detecting the peripheral processing device coupled to the edge device at a second time after the first time, the third value being greater than the first value.

18. The apparatus of claim 12, wherein the first device identifier and the second device identifier are Internet Protocol (IP) addresses.

19. The non-transitory processor-readable medium of claim 1, further comprising code to cause the processor to implement forwarding-state information included in the first forwarding-state packet when a value of the first generation identifier is greater than a value of the second generation identifier.

* * * * *